United States Patent [19]
Lieuwen

[11] Patent Number: 6,069,946
[45] Date of Patent: *May 30, 2000

[54] TELECOMMUNICATIONS SYSTEM FOR PROVIDING A CALLING PARTY CONTROL SERVICE

[75] Inventor: Daniel Francis Lieuwen, Plainfield, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/982,684

[22] Filed: Dec. 2, 1997

[51] Int. Cl.$^7$ ...................................... H04M 7/00
[52] U.S. Cl. .................. 379/220; 379/204; 379/211; 379/219
[58] Field of Search .............................. 379/21–211, 219, 379/220, 114, 204, 201, 88.01, 93.23

[56] References Cited

U.S. PATENT DOCUMENTS

| | | | |
|---|---|---|---|
| 5,260,986 | 11/1993 | Pershan | 379/57 |
| 5,327,486 | 7/1994 | Wolff et al. | 379/93.23 |
| 5,329,578 | 7/1997 | Brennan et al. | 379/20 |
| 5,392,342 | 2/1995 | Rosenthal | 379/211 |
| 5,430,791 | 7/1995 | Feit et al. | 379/88.01 |
| 5,537,464 | 7/1996 | Lewis et al. | 379/114 |
| 5,559,860 | 9/1996 | Mizikovsky | 379/58 |
| 5,652,789 | 7/1997 | Miner et al. | 379/201 |
| 5,673,299 | 9/1997 | Fuller et al. | 379/210 |
| 5,802,160 | 9/1998 | Kugell | 379/211 |

FOREIGN PATENT DOCUMENTS

| | | | |
|---|---|---|---|
| 0 550 975 | 7/1993 | European Pat. Off. | H04Q 3/00 |
| 0 588 646 | 3/1994 | European Pat. Off. | H04M 3/42 |

Primary Examiner—Krista Zele
Assistant Examiner—Bing Bui
Attorney, Agent, or Firm—Donald P. Dinella

[57] ABSTRACT

A technique for providing calling party definition and control of the contact information and sequencing used to reach a particular called party. The calling party specifies a set of communications devices along with their respective contact numbers for use in contacting a particular called party. Thereafter, for example, a telecommunications service provider will attempt to locate the called party in accordance with the designated set of devices and respective contact numbers so designated by the calling party. Advantageously, the technique provides a significant amount of increased control to the calling party in defining and controlling the sequence in which attempts are made to reach a particular called party.

25 Claims, 4 Drawing Sheets

| 600 | CALLING PARTY PIN | CALLED PARTY PIN 610 | | |
|---|---|---|---|---|---|
| 620 DEVICE NUMBER | 630 DEVICE TYPE | 640 CONTACT NUMBER | 650 PRIORITY | 660 BILLING INFORMATION |
| 1 | WIRED TELEPHONE | (908) 123-4567 | 2 | ACCOUNT NO. 123 |
| 2 | CELLULAR TELEPHONE | (908) 222-3333 | 1 | ACCOUNT NO. 345 |
| 3 | PAGER | (800) 999-9999 | 3 | HOME ACCOUNT (201)111-2222 |
| . | . | . | . | . |
| . | . | . | . | . |
| . | . | . | . | . |
| . | . | . | . | . |
| N | . | . | . | . |

TELECOMMUNICATIONS SYSTEM FOR PROVIDING A CALLING PARTY CONTROL SERVICE

FIELD OF THE INVENTION

The present invention relates to telecommunications systems, and more particularly, to the processing of communications in and through such systems.

BACKGROUND OF THE INVENTION

Modem day advances in telecommunications systems continue to unfold at rapid levels. Telecommunications equipment manufacturers and telecommunications service providers continue to provide new equipment features and service offerings directed at easing and improving the ways in which people communicate. As such advanced offerings are made available to telecommunications subscribers the myriad of contact numbers and communications devices at which they may be contacted significantly increases. For example, in today's telecommunications marketplace is not unusual for the average person to be contacted at contact numbers associate with, e.g., a business telephone, a business facsimile machine, a cellular telephone, a personal pager, a personal computer, a personal telephone and/or a personal facsimile machine. As the potential number of contact points for an individual increases so does the complexity and frustration level of calling parties attempting to contact a particular person.

There exist many telecommunications systems and techniques which are directed to reducing the complexity and frustration to reach called parties having a variety of contact numbers. For example, U.S. Pat. No. 5,384,831 issued to Creswell et al. on Jan. 24, 1995, describes a system for providing personal telecommunications services to a subscriber (i.e., the called party) wherein the subscriber may associate different call identifiers with different specifications which define respective call treatments. Creswell's system allows individual subscribers (i.e., the called party) to customize their incoming call treatment, for example, forwarding a telephone call associated with a call identifier to one of a number of different destinations. Similarly, U.S. Pat. No. 5,329,578 issued to Brennan et al. on Jul. 12, 1994, describes a so-called personal communication service (hereinafter "PCS") where calls to a personal number are routed to a PCS service node, which manages the communications services for all subscribers, i.e., called parties. Brennan's PCS governs how attempts to communicate with a called party are handled with appropriate considerations, for example, for who is calling, when the call is made, and the urgency of a particular call. Brennan's system provides the called party with personal control over the way in which the system will operate in completing individual calls made to them from calling parties. Further, Brennan's system provides a so-called "hunting" feature which attempts to contact the called party at a sequence of likely locations which were previously defined by the called party and stored in the system. Upon receiving an incoming call for a particular called party, Brennan's system will attempt to complete the call to the called party by "hunting" through the previously stored list of contact locations.

The prior art is replete with telecommunications systems typified by the technology of the above-described systems where the called party is provided various customized options and a level of control as to how that called party may be reached via various communication devices (and the associated contact numbers therewith) used with various services to which that called party subscribes, i.e., wired telephone, cellular telephone, facsimile, pager, etc. Of course, the primary advantage of such prior art systems is the fact that the called party controls and prescribes the treatment of incoming calls to a particular contact number and how that call may be routed to the plethora of communications devices at any one time in an effort to reach that party. This called party control feature although very advantageous does present certain obstacles to the calling party attempting to reach a particular called party. For instance, the calling party to such systems is routed in accordance with the called party's previously defined routing sequence and is usually prevented from interactively participating in the routing sequence. That is, the calling party has no control or input as to the routing of a call to the called party in such a system. Thus, if the incoming call from the calling party, for example, is routed to a particular device to which an answering machine is connected, this device will allow for call completion but leaves the calling party with the only option of leaving a message and not actually completing his desired action of speaking with the called partly directly. Further problems arise for the calling party, for example, when the incoming call is completed but is answered not by the called party but by the another person, e.g., the called party's administrative assistant. Again, the call is completed but the calling party's desired result of actual contact with the called party is defeated.

One known arrangement which addresses the above-described dilemmas of called party controlled telecommunications systems is described in U.S. Pat. No. 5,487,111 issued to R. D. Slusky on Jan. 23, 1996. Slusky describes an enhancement in telecommunications systems employing so-called "sequence calling". Sequence calling is a telecommunications service feature which allows a telephone service subscriber to specify to the telecommunications infrastructure, e.g., an inter-exchange network, a sequence of telephone numbers to which a call to the subscriber, i.e., called party, can be routed until the subscriber is "found". For example, the called party may have a personal telephone number of the like associated, for example, with the so-called personal EasyReach™ 700 service available from AT&T Corp. Thus, a subscriber to a "700" telephone number is able to specify that a call to that personal number should be routed, for example, first to the subscriber's office telephone and then, if no answer there, to the subscriber's cellular telephone number and, if no answer there, to the subscriber's home telephone. Significantly, Slusky's system addresses the situation where a call to one of the previously defined contact telephone numbers is actually answered by someone other than the subscriber. That is, the calling party to the subscriber's "700" telephone number is presented, for example, a recorded announcement by the telecommunications system that the subscriber, i.e., the called party, has designated a list of telephone numbers to which the incoming "700" call will be routed in sequence in order to reach the called party. The calling party is told that he may cause the call to proceed to the next number in the designated sequence at almost any point in time even if the call is completed to a particular one of the telephone numbers in the sequence. However, the calling party must proceed in the call completion sequence through the telephone numbers as previously designated by the called party. Further, the calling party has no input into the contact information used by the system to route their call to the called party.

Therefore, a need exists for a technique which provides a calling party with increased control over the call sequencing process used, for example, in a telecommunications system, to contact a called party at a variety of communications devices.

SUMMARY OF THE INVENTION

The present invention provides a technique for calling party definition and control of the contact information and sequencing used to reach a particular called party. In accordance with invention, the calling party specifies a set of devices along with their respective contact numbers for use in contacting a particular called party. Thereafter, the service will attempt to locate the called party in accordance with the designated set of communications devices and respective contact numbers so designated by the calling party.

In accordance with various embodiments of the invention, a telecommunications service provider establishes a standardized number, e.g., a toll-free number, for accessing a service which allows the calling party to identify and designate the set of devices to contact a particular called party along with their respective contact numbers, for example, by specifying particular telephone numbers, facsimile numbers and pager numbers. In accordance with an embodiment of the invention, the calling party may also designate the actual sequence in which the service is to cycle through the set of devices or assign a particular communication priority to various ones of the communications devices to be used. The information designated by the calling party is stored by the telecommunications service provider, for example, in a calling party sequence control record. Thereafter, the telecommunications service provider attempts to contact the called party using the information received from the calling party until contact is established between the parties or until a predetermined period of time has expired without establishing the contact. Advantageously, the present invention provides a significant amount of increased control to the calling party in defining the information used and controlling the sequence in which attempts are made to reach a particular called party.

In accordance with further embodiments of the invention, the telecommunications service provider may provide the calling party with access to particular directory services or databases which contain contact information for called parties useful in defining the calling party sequence control record. Further, the telecommunications service provider may provide an option to the calling party of establishing unique called party profiles to be used by the calling party to contact, for example, frequently called individuals such as family members. Such customized service offerings could be accessed by the calling party, for example, using a personal identification number assigned by the service to the calling party.

Sequence calling techniques are not new as evidenced, for example, in U.S. Pat. No. 5,329,578 and U.S. Pat. No. 5,487,111 discussed above. It has, however, remained for the inventor herein to recognize that providing a technique which relegates primary and significant control to the calling party over the information and communications process used in establishing contact with a particular called party is particularly advantageous.

DETAILED DESCRIPTION

The present invention provides a technique for calling party definition and control of the contact information and sequencing used to reach a particular called party. In accordance with invention, the calling party specifies a set of devices along with their respective contact numbers for use in contacting a particular called party. Thereafter, the service will attempt to locate the called party in accordance with the designated set of devices and respective contact numbers so designated by the calling party.

Figure 1:
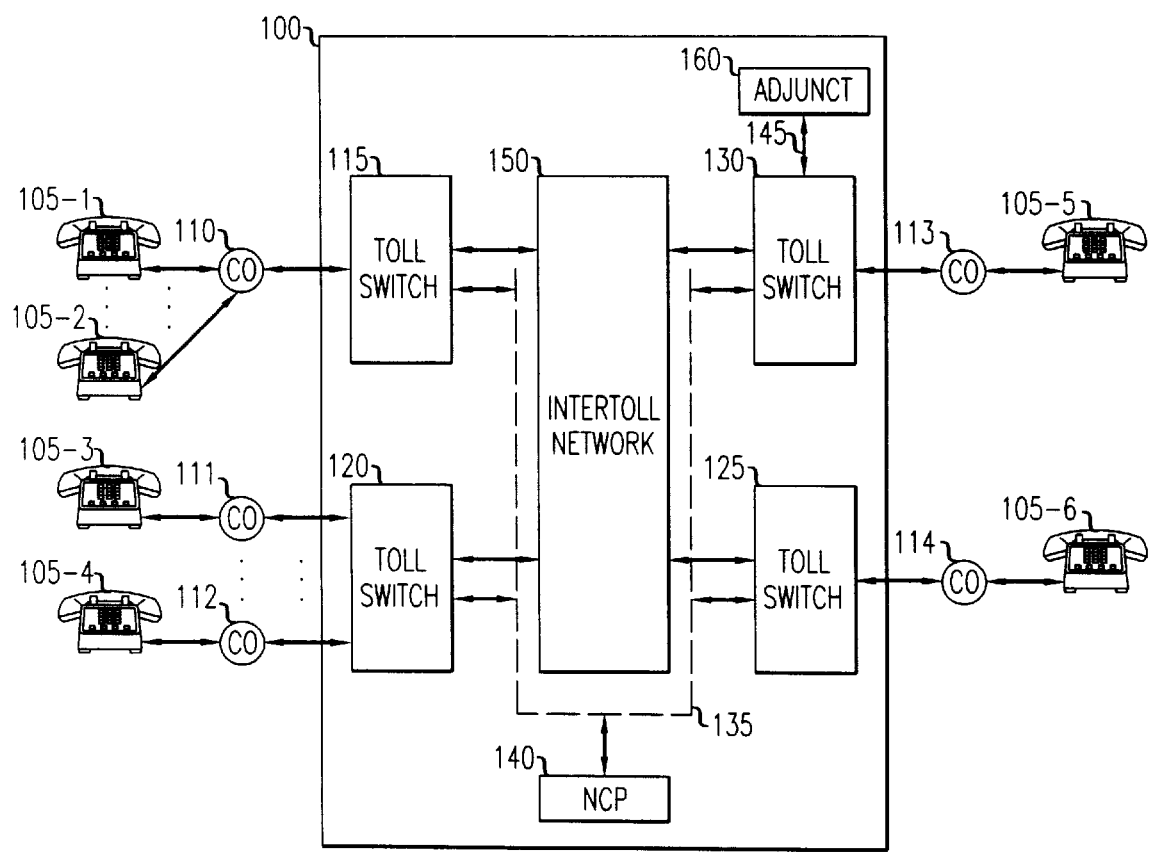
FIG. 1 is a block diagram of an illustrative communications network in which the present invention is implemented.

FIG. 1 is a block diagram of an illustrative communications network in which the present invention is implemented. In accordance with this embodiment, communications network 100, e.g., is a public switched telephone network such as the well-known inter-exchange network of AT&T Corp., that provides long distance telephone services for its subscribers. These subscribers access communications network 100 through, e.g., communications devices 105-1 through 105-6, which are, e.g., customer premise equipment, wired telephones, personal computers, cellular telephones, pagers and facsimile machines. Communications network 100 includes, inter alia, a plurality of toll switches, e.g., shown in FIG. 1 as toll switches 115, 120, 125, and 130. These toll switches may be any of the well-known types of telecommunications switching equipment, e.g., the No. 4ESS® (Electronic Switching System) or the No. 5ESS® available from Lucent Technologies Inc. As shown in FIG. 1, each of toll switches 115, 120, 125, and 130 are connected to a number of other switches via a so-called inter-toll network shown as block 150. Each toll switch may also be connected to multiple central offices (CO), e.g., CO's 110 through 114. The operation of such CO's is well-known, e.g., as discussed in "Engineering and Operations in the Bell System", Second Edition, Eighth Printing, 1993, and the detail of which will not be further discussed herein. In short, a CO is arranged to extend to a corresponding toll switch of communications network 100 a telephone call originating at, e.g., communications device 105-1, from which a calling party has dialed a particular telephone number. The CO, e.g., CO 110, is further arranged to extend the call connection to, e.g., communications device 105-6 associated with the called party and to the CO, e.g., CO 114, which receives the extension of the call from the corresponding toll switch, e.g., toll switch 125.

Toll switches 115, 120, 125 and 130 of communications network 100 are interconnected via data link 135, which may be, e.g., the well-known System Signaling 7 (SS7) network. Communications network 100 is arranged so that the toll switches may exchange data messages with one another to establish a connection between a calling party (e.g., communications device 105-1) and a called party (e.g., communications device 105-6), via communications network 100. That is, the connection is made by extending a call through communications network 100 until the call is completed (e.g., the called party answers the call by going "off-hook") between the calling party and the called party. Communications network 100 further includes a number of centralized databases commonly known as Network Control Points (NCPs), a single one of which is shown as NCP 140. As is well-known, NCP's, such as NCP 140, are strategically positioned at various positions within communications network 100 to support various service features accessed and provided through the network such as the well-known "800" or "888" toll-free telephone number services. As will be further discussed below, various embodiments of the present invention are realized using such toll-free telephone number services.

More particularly, a telecommunications service provider may provide a service in accordance with the invention (hereinafter alternatively referred to as "the service" or "the telecommunications service") a calling party through the use of a toll-free "888" service number, e.g., 1-888-xxx-xxxx, associated with the telecommunications service provider's offering to the public at large. An example of a method and apparatus for facilitating the delivery of such a service is described in U.S. patent application Ser. No. 08/982,685, filed on even date herewith in the name of the present Applicant and assigned to the same Assignee. As will be appreciated, the telecommunications service provider can be understood to be alternatively referred to as a telecommunications carrier. As will be further understood, the telecommunications service provider or telecommunications carrier, may own and operate, e.g., communications network 100 (see, FIG. 1) for delivering a variety of services. Of course, alternatively, the telecommunications service provider may offer services through the use of another party's network. In either case, the advantages of the invention are fully realized.

In accordance with the invention, the service will allow the calling party to designate certain information (e.g., communications device type, respective contact numbers for the devices, call priority, etc.) to be used in contacting a particular called party. Thereafter, the telecommunications service provider, utilizing communications network 100 as described above, will attempt to locate the called party in accordance with the set of devices and respective contact numbers designated by the calling party. Illustratively, the contact between the calling party and the called party is realized by extending a call through, e.g., communications network 100 as mentioned previously and further described below.

Specifically, toll switch 115, e.g., is responsive to the receipt of a call associated with the 888 service number dialed by the calling party from, e.g., communications device 105-1. Upon receipt of such a call, toll switch 115 sends a query message to NCP 140. The query message includes a number of fields identifying certain information such as toll switch 115, a destination group index, the dialed toll-free 888 number, and a call identifier. The destination group index is used to route the message to the appropriate NCP of communications network 100. The call identifier is used to associate a subsequent response from the appropriate NCP with the correct call. For example, after the message is routed to NCP 140, the specific 888 telephone number contained in the message is translated, in a conventional manner, by NCP 140 to a destination telephone number. In accordance with an embodiment of the invention, the destination telephone number so translated by NCP 140 is a telephone number associated with adjunct 160. NCP 140 then forms a response message comprising at least the following items: (i) the identity of toll switch 115 so that the message may be routed thereto via inter-toll network 150; (ii) a destination telephone number so that the associated call may be routed to its intended destination; and (iii) a call identifier equivalent to the call identifier contained in the query message. Upon receipt of the response message, toll switch 115 translates the destination telephone number into a destination toll switch identifier (i.e., a switch address) and forwards the associated call thereto via inter-toll network 150. Thus, toll switch 115 sends a conventional call set-up message to the destination switch, e.g., toll switch 130, via data link 135 to alert the destination switch that a call has been forwarded. The call set-up message includes items such as (i) the identity of toll switches 115 and 130; (ii) the destination telephone number; and (iii) the Automatic Identification Number (ANI) associated with the calling party's communications device, e.g., communications device 105-1. Thereafter, in a conventional manner, toll switch 130 derives the routing of the newly-received call as a function of the information contained in the call set-up message. That is, toll switch 130 routes the call to the destination associated with the dialed 888 service number. Illustratively, in accordance with various embodiments of the invention, the call is forwarded to adjunct 160 via communications path 145.

Figure 2:
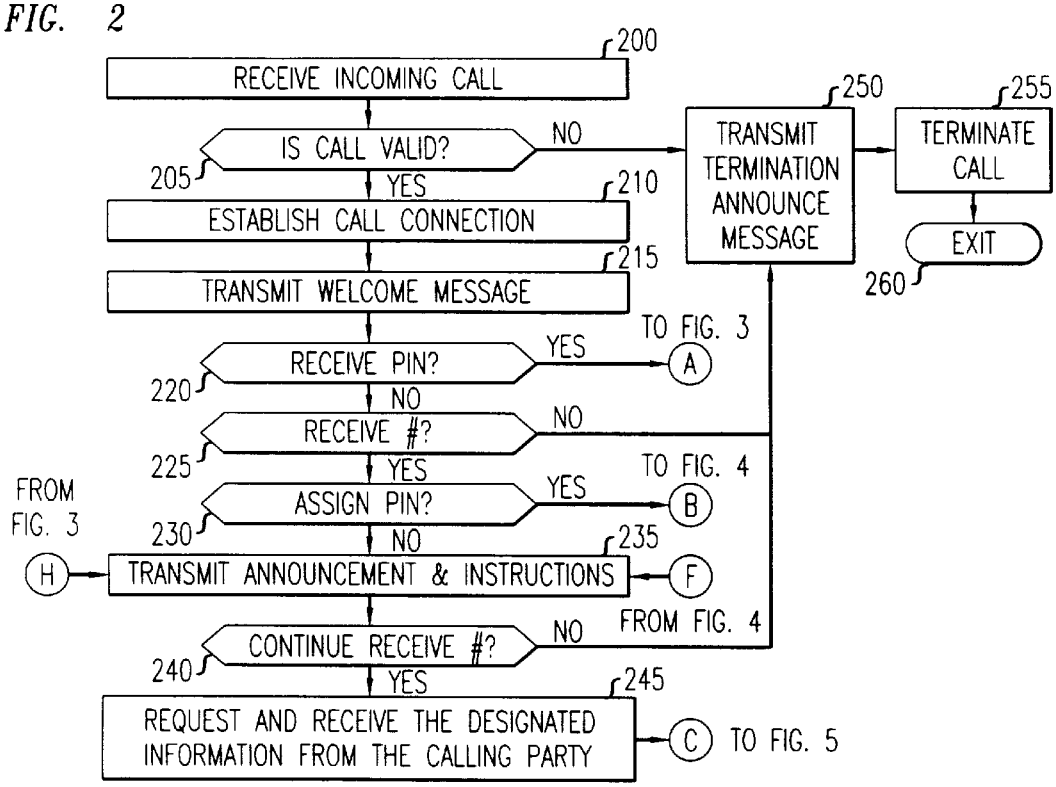
FIGS. 2–5 are flowcharts showing steps for implementing the principles of the invention in the communications network depicted in FIG. 1.

More particularly, FIGS. 2–5 are flowcharts showing steps for implementing the principles of the invention in, e.g., communications network 100 depicted in FIG. 1. As will be appreciated and as mentioned previously, the principles of the invention can be implemented by any service provider whether or not such service provider operates a network such as communications network 100. For example, the invention can be implemented in service offerings by inter-exchange carriers, local exchange companies (LEC's), combinations of inter-exchange carriers and LEC's, or independent telephone companies to name just a few. Turning our attention to FIG. 2, a calling party will initiate a call to a service offered by a telecommunications service provider embodying the principles of the invention. For example, AT&T Corp., a well known telecommunications service provider, operating their own inter-exchange network, may advertise a specific toll free telephone number which is associated with a telecommunications service employing my inventive technique. As described above, such a toll-free call is received by the telecommunications service provider (block 200) from a particular calling party. In a conventional manner, the validity of the toll free number is verified (block 205) and transfer of the incoming call to the toll free number is transferred, as described above, to adjunct 160 (see, FIG. 1) for delivering the service in accordance with invention. After establishing the appropriate call connection (block 210), the service will transmit a prerecorded "welcome" announcement (block 215) to the calling party providing, illustratively, a brief introduction and instructions related to the service. An illustrative example of such a "welcome" announcement is:

"Welcome to our service which provides you, the calling party, with the ability to define and control the information and call sequencing we will use to reach a particular called party. If you are one of our frequent users and have a personal identification number, please enter your personal identification number now, otherwise, please hit the pound sign to continue."

Figure 3:
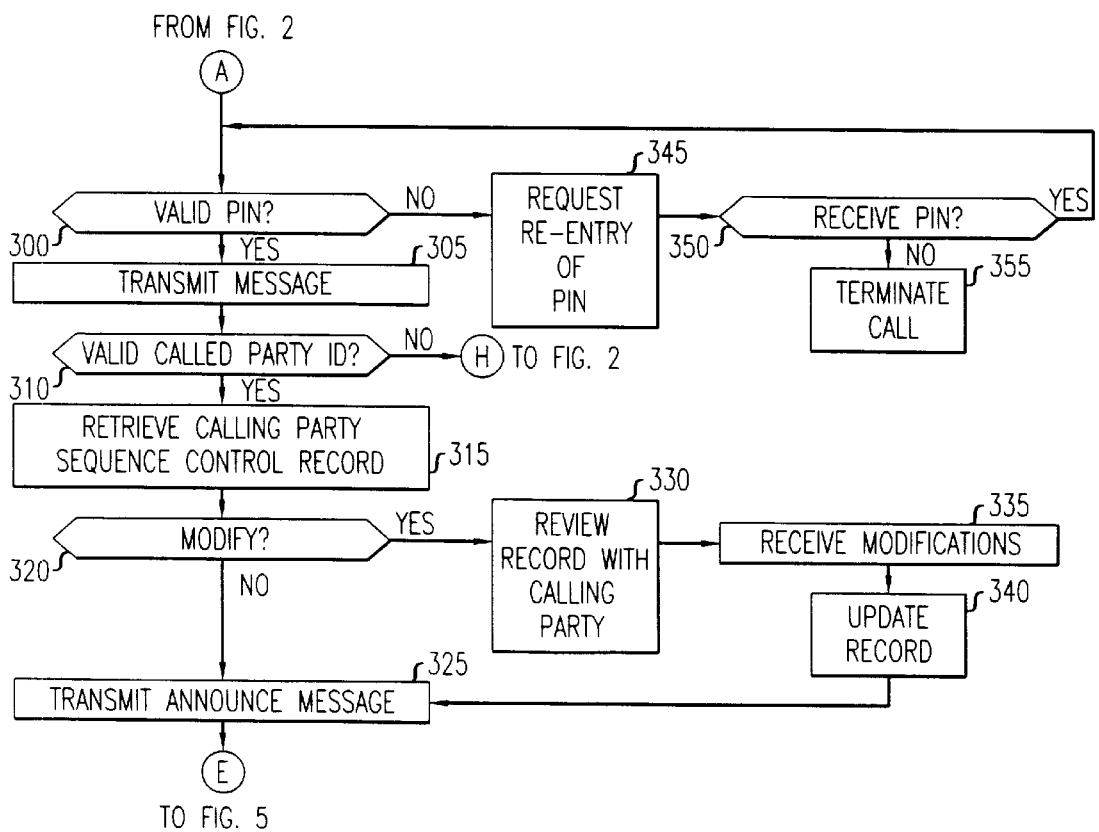

The service then monitors communications path 145 (see, FIG. 1) for receipt (block 220) of a personal identification number (PIN) or the receipt (block 225) of the pound (i.e., #) sign from the calling party. As will be appreciated, the pound sign can be designated by the calling party in a conventional manner using a touch-tone telephone. If a PIN is received, for example, this designates that the calling party has previously made use of the service and, in accordance with an embodiment of the invention, has had the service store a calling party sequence control record (see, FIG. 6 and described in more detail below) which defines a particular designated set of devices and associated contact numbers for a particular called party. The way in which the service operates to serve those calling parties having a PIN, in accordance with an embodiment of the invention, is shown in FIG. 3 and is further discussed below.

Alternatively, if the calling party inputs the pound sign designation this signifies that the calling party is, e.g., a first time user of the service or has previously chosen not to acquire a PIN. If so, in accordance with this embodiment of the invention, the service queries the calling party as to whether they wish to have a PIN assigned for future use (block 230) in accessing the service. If the calling party so desires the service will assign the PIN as illustratively shown in FIG. 4 and further discussed below. If the calling party does not desire a PIN number, the service transmits another announcement (block 235) which includes, e.g., a description of the service along with a set of instruction for designating the requisite information used in providing the increased calling party control of the calling sequence in accordance with the invention. An illustrative example of such an announcement is:

"The present service will enable you, the calling party, to designate certain information and control the call sequencing we will use to reach a particular called party. In a moment, we will ask you to indicate certain information to be used in contacting your desired called party. Some of the requested information is specific to your desired called party. The requested information will include, for example, communications device type, associated contact numbers for the devices, call priority or billing preferences. Thereafter, our service will attempt to locate the called party in accordance with your designated information. If you would like to proceed with this service, please press the pound sign or say "yes", otherwise, this call will be terminated and we thank you for your inquiry."

After transmitting the aforementioned instruction message, the service monitors communications path 145 (see, FIG. 1) for the receipt (block 240) of the pound sign (e.g., the button on a touch-tone telephone having the designation "#"). As will be appreciated, the service could also allow for the calling party to supply a voice response (as discussed further below) to continue. If the calling party does not enter the pound sound as requested, the service will transmit a call termination announce message (block 250), terminate the call (block 255) and exit the service (block 260). Otherwise, if the pound sign is detected by the service, the service will then request and receive the information designated from the calling party (block 245) to create, in accordance with an embodiment of the invention, the so-called calling party sequence control record. An illustrative calling party sequence control record is shown in FIG. 6.

Figures 6, 7:
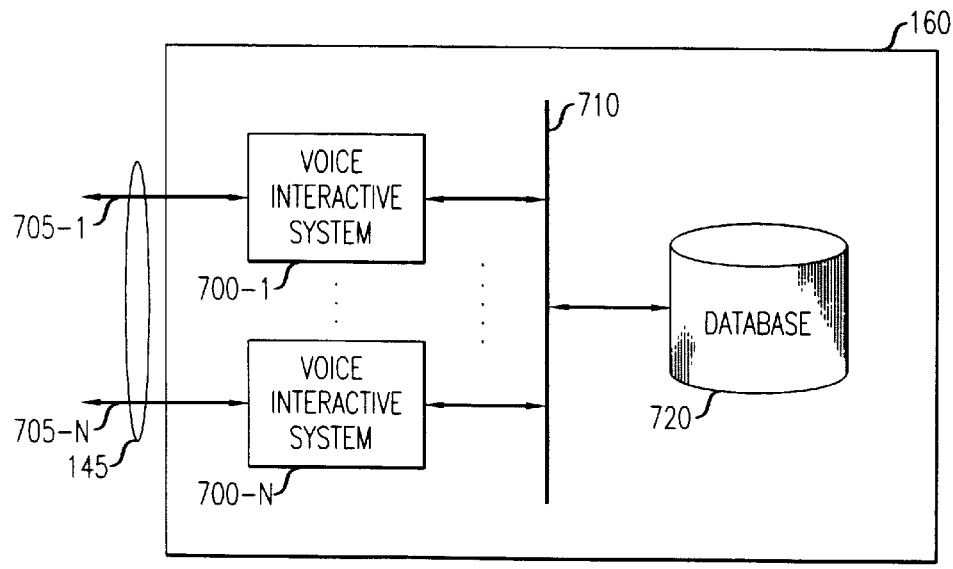
FIG. 6 is an illustrative calling party sequence control record defined by the calling party in accordance with invention.
FIG. 7 is an illustrative configuration of the adjunct of FIG. 1 for implementing the invention.

As seen in FIG. 6, illustrative calling party sequence control record 600 contains information collected and stored in accordance with the invention such as: the calling party's PIN number, as applicable, in record header 610; a called party identification which is assigned by the service (see, record header 610); device number 620 for each communications device identified by the calling party for use in contacting the desired called party; device type 630 designating the type of each communications device identified by the calling party; the respective contact number for each designated device 640; priority 650 designated by the calling party to specifically associate calling priorities with the designated devices; and billing information 660. In accordance with an embodiment of the invention, adjunct 160 (see, FIG. 1) is used by the service to collect the requisite information from the calling party to create calling party sequence control record 600. As shown in FIG. 6, the calling party sequence control record 600 is illustratively populated with a series of individual entries 600-1 through 600-N containing the information designated by the calling party.

Turning our attention to FIG. 7, it is seen that an illustrative arrangement of adjunct 160 includes several interactive systems 700-1 through 700-N based upon the level of communications traffic through adjunct 160. One such interactive system 700-1 may be, for example the well known CONVERSANT Voice Information System available from Lucent Technologies Inc., which facilitates the collection of the relevant information by the service from the calling party, in a conventional manner, to allow for the creation of the calling party sequence control record 600 in accordance with the invention. As further shown in FIG. 7, adjunct 160 also includes local area network 710 for interfacing interactive systems 700-1 through 700-N with database 720. In accordance with an embodiment of the invention, the calling party sequence control record(s) 600 created by the service are stored in and accessed from database 720 in a conventional manner. Further, each of the interactive systems 700-1 through 700-N may communicate with database 720 via local area network 710 for the purpose of accessing or updating, e.g., individual calling party sequence control record(s) 600 or assigning a calling party's PIN. In accordance with various embodiments of the invention, communications channels 705-1 through 705-N, being part of communications path 145, are used for extending calls through, e.g., communications network 100 in accordance with the designated information in the calling party sequence control record(s) 600 as further discussed below.

Turning our attention back to FIG. 2, once the service has received the requisite information from the calling party (block 245) and created the associated calling party sequence control record 600, the service is ready to start the calling sequence in accordance with the calling party's instructions. As will be appreciated, the actual receipt of the requisite information from the calling party to create calling party sequence control record 600 can be captured in a number of ways. For example, the calling party may use the touch-tone dialing features of their communications device (e.g., customer premise equipment) to respond to certain prompts, e.g., from the aforementioned CONVERSANT system. Alternatively, the calling party's entries may be captured using known voice recognition and speech processing techniques, also available in the aforementioned CONVERSANT system, which would allow the calling party to respond to system prompts through voice responses. Further, the service may provide access to different types of directory services or informational databases to assist the calling party in providing the requisite information. As will be appreciated, such assistance will eliminate the need for the calling party to previously know or to have all the contact information prior to accessing the service. In this way, the calling party may access certain contact information in an "on-the-fly" manner during the query process used by the service.

Figure 5:
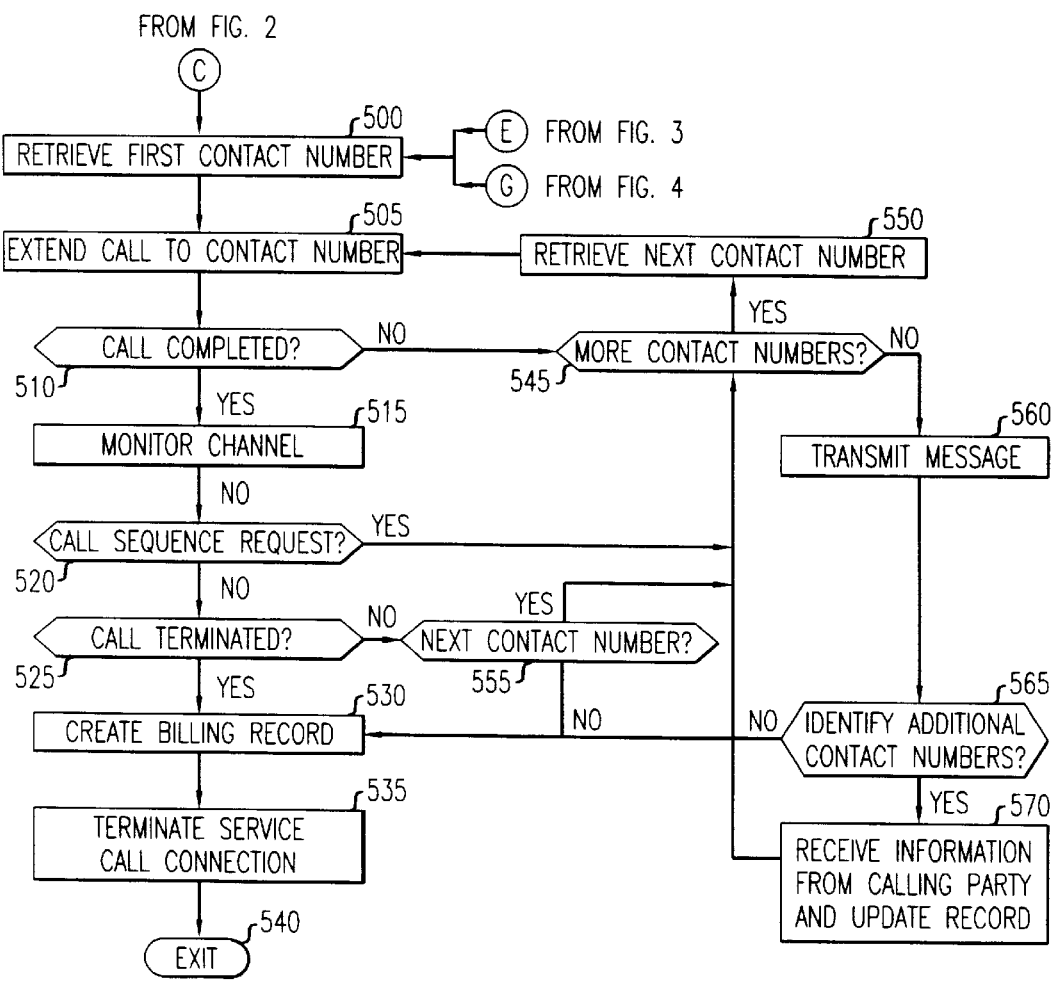

FIG. 5 illustrates a particular call sequencing and call completion flow for the service in accordance with the invention. More particularly, the service retrieves (block 500) the first contact number (see, e.g., FIG. 6, entry 600-1) in the calling party sequence control record 600 as designated by the calling party. The service then attempts to extend a call (block 505) to the retrieved contact number. In a further embodiment of the invention, the contact numbers 640 are processed by the service in accordance with priority 650 specified by the calling party. As will be appreciated, in such an embodiment, the first contact number 640 does not have to necessarily be the highest indicated priority 650. In the present example, let us assume that the calling party has not associated any priority 650 with contact numbers 640 so the service may begin with the first contact number, e.g., as contained in entry 600-1, in calling party sequence control record 600. As indicated above, the service will then attempt to extend (block 505) and complete a call in a conventional manner through communications network 100 to the retrieved contact number. The service will monitor the call completion attempt to determine if the call is completed (block 510). In accordance with an embodiment of the invention, the service provider could provide for a messaging feature wherein the calling party could either record a present message or retrieve a prerecorded for message to leave for particular called parties upon certain instances of call completion. Alternatively, the service provider could also provide for a "call completion" feature wherein, once the calling party has identified, and the service has launched, the desired contacts to a particular called party, the service will provide a unique notification back to the calling party upon call completion. This would allow for the calling party to perform other tasks while waiting for the service to contact the desired called party.

In accordance with a further embodiment of the invention, the service can be configured to set a counter to a particular value indicative of an elapsed time period (e.g., 10 seconds) for determining how long the service should attempt to complete a call to a particular contact number (e.g., as contained in entries 600-1 through 600-N, respectively) from the calling party sequence control record 600. For example, if the counter is decremented to zero this indicates the call has not been completed and the service will determine whether another contact number exists (block 545) in the calling party sequence control record 600, and if so, retrieve the next contact number (block 550), e.g., as contained in entry 600-2, and begin the call completion process anew (i.e., block 505). If no other contact numbers are available, the service will transmit a message to the calling party (block 560) indicating, e.g., that the service has processed all of the contact numbers 640 in the calling party sequence control record 600. The service will than query the calling party as to whether the calling party wishes to identify additional contact devices and associated contact numbers (block 565). If not, the service can, for example, create a billing record (block 530). If so, as discussed previously, the information is received from the calling party and an update is made (block 570) to the calling party sequence control record 600. The service then continues (i.e., blocks 545 and 550, respectively) with the next contact number in the calling party sequence control record 600 as described above.

Continuing, if the call between the calling party and called party is completed to contact number 640, the service will monitor the channel (block 515) for at least a predetermined interval. This monitoring enables the service to address various call scenarios which may arise. For example, although the call may have been completed to the particular contact number 640 the called party may not have been the actual party answering the phone. For example, perhaps the call was placed to the called party's workplace and the called party's assistant answered the call. In such a case, the service will monitor the channel and determine whether a "completed" call sequencing request has been received (block 520). As discussed previously, one technique for the call sequencing of completed calls is described in U.S. Pat. No. 5,487,111 issued to R. D. Slusky on Jan. 23, 1996. Such completed call sequencing would allow the calling party to advance to the next contact number 640 in the calling party sequence control record 600 even though the call was completed to the previous contact number. Alternatively, the service could be adapted to query the calling party, e.g., as shown in block 555 of FIG. 5, after each completed call as to whether the calling party wished to continue with the next contact number in the calling party sequence control record 600 rather than terminate the call. However, if the service determines that the calling party has indeed terminated the call (block 525) with the called party, the service can, e.g., create a billing record (block 530), terminate the service call connection (block 535), and exit (block 540). The billing record created by the service, for example, uses billing information 660 from calling party sequence control record 600 to create a billing record in accordance with the calling party's instructions. For example, the calling party may have designated that all calls completed during the use of the service are to be billed to a business account, or other ones of the calls are to billed to a personal home telephone service account. Thus, the calling party is given the flexibility to create different billing treatments within a particular calling party sequence control record 600.

Further embodiments of the invention provide additional flexibility and capability to the service offering of the telecommunications service provider. In particular, FIG. 3 shows a flowchart of operations in a further embodiment of the invention for processing the requests of those calling parties who are repeated users of the service by virtue of the fact that they have been previously assigned some type of unique identifier by the service provider, e.g., a PIN. When the calling party has entered their PIN (see, FIG. 2, block 220) the service first verifies that the PIN is valid for the particular service (block 300). If the PIN is found to be invalid, the service will request that the PIN be re-entered (blocks 345 and 350, respectively) and restart the verification process. If the PIN is again found to be invalid, the service will, for example, transmit a message to the calling party indicating the invalidity of the PIN and terminate the call (block 355). If a valid PIN has been entered by the calling party, the service transmits a message (block 305) to the calling party, for example, which would be directed at frequent users of the service and provide some additional instructions. For example, a frequent calling party user of the service has the option of storing certain ones of their previously defined calling party sequence control record(s) 600. As described previously, calling party sequence control record(s) 600 may contain certain header information (see, FIG. 6, header 610) which includes the calling party PIN and the called party ID. Thus, after receiving a valid PIN, the service will query the calling party for a particular called party user ID (block 310), if known. Alternatively, as will be appreciated, the service could present all known called party ID's as previously defined by the calling party for the selection thereof If a valid called party ID is not received the calling party is transferred back to the main instruction sequence of the service for further processing (e.g., FIG. 2, block 235).

However, if a valid called party ID is received, the service will retrieve (block 315) the particular calling party sequence control record 600 associated with the specific calling party PIN and called party ID. At this point, the service will query the calling party as to whether any modifications (block 320) to the retrieved calling party sequence control record 600 are to be made. If not, the service will transmit a message (block 325), for example, that call processing will now begin and transfer control of the service to the operations previously described beginning at FIG. 5, block 500. If the calling party has indicated that changes are to be made to the retrieved calling party sequence control record 600, the service reviews the retrieved calling party sequence control record 600 with the calling party (block 330). Then, the service receives the desired modifications from the calling party (block 335), e.g., additions or deletions to the record, and updates (block 340) the calling party sequence control record 600. After updating the record (block 340), the service will transmit a message (block 325), for example, that call processing will now begin and transfer control of the service to the operations previously described beginning, e.g., at FIG. 5, block 500. As will be appreciated, in further embodiments of the invention, multiple calling party sequence control records could be designated by the calling party for retrieval by the service. In such an embodiment, the calling party could define a calling pattern which alternates, for example, based on designated priorities between two or more calling party sequence control records. The service will then use the multiple records to extend calls to achieve the desired calling pattern as designated by the calling party.

Figure 4:
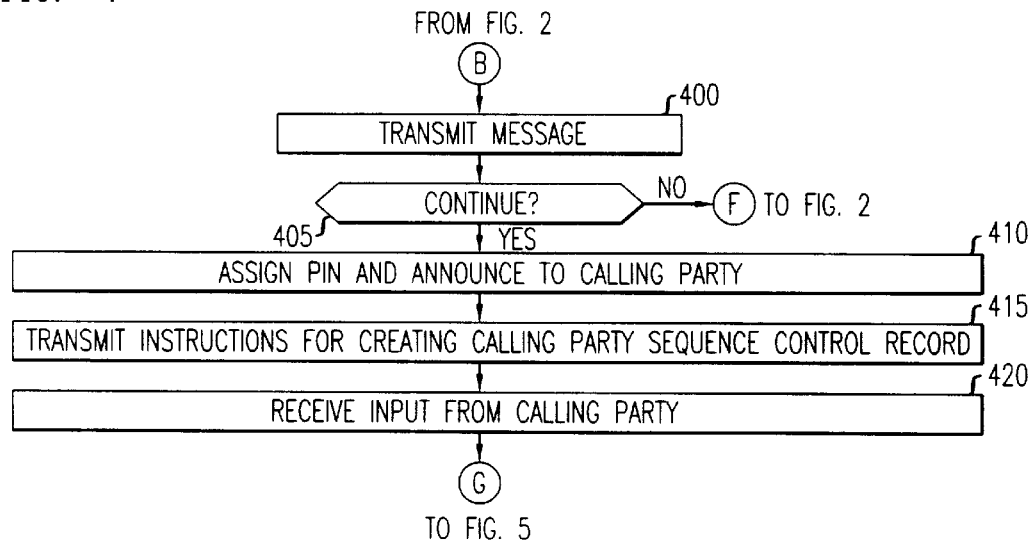

As discussed above, a PIN is used in various embodiments of the invention to identify certain calling parties known to be frequent users of the service or those calling parties which have requested a PIN from the service. To that end, FIG. 4 is a flowchart of illustrative operations used by the service for assigning a PIN to those calling parties wishing to so register with the telecommunications service provider. Upon receiving an indication that a calling party has requested the assignment of a PIN (see, FIG. 2, block 230), the service transmits a message (block 400) which, for example, could include an explanation of the PIN, services associated with the PIN and how to use the PIN. The service then queries the calling party as to whether the party wishes to continue (block 405) with the PIN assignment process. If not, the calling party is transferred back to the main service operations, e.g., block 235 of FIG. 2. Otherwise, the service will automatically assign a PIN (or query the calling party to input a preferred PIN designation) for use by the calling party and announce the PIN to the calling party (block 410). Illustratively, the PIN's assigned by the service may be stored in a conventional manner in database 720 shown in FIG. 7. The service then transmits further instructions (block 415) as to how to create calling party control sequence record 600 and that the service will now be asking for certain input from the calling party to create calling party sequence control record 600. After receiving the requested input from the calling party (block 420) and creating the record, the calling party is transferred back to the main call sequencing service operations, e.g., block 500 of FIG. 5.

Advantageously, the invention provides primary and significant control to the calling party over the information and communications process used in establishing contact with a particular called party. The foregoing merely illustrates the principles of the present invention. Those skilled in the art will be able to devise numerous arrangements which, although not explicitly shown or described herein, embody those principles and are within their spirit and scope.

I claim:

1. A method for use by a telecommunications service provider in offering a telecommunications service for establishing a contact between a calling party and a called party over a communications network, the method comprising the steps of:

initiating the contact to the called party by the calling party via the telecommunications service;

collecting, in response to the initiated contact, information input directly from the calling party which is related to the called party, the collected information being independent from any information originating from the telecommunications service provider in the service offering and including information regarding a plurality of communications devices associated with the called party and a plurality of contact numbers, each one of the plurality of contact numbers corresponding to at least one communications device of the plurality of communications devices; and establishing the contact between the calling party and the called party by extending a call through the communications network as a function of the information collected from the calling party.

2. The method of claim 1 further comprising the step of:

storing the information in a database in the form of a calling party sequence control record.

3. The method of claim 2 further comprising the steps of:

providing the calling party with a personal identification number and updating the calling party sequence control record to contain the personal identification number;

querying the calling party to input the personal identification number;, in response to receiving the personal identification number, retrieving the calling party sequence control record which contains the personal identification number from the database; and modifying the retrieved calling party sequence control record as a function of inputs received from the calling party.

4. The method of claim 3 wherein the querying the calling party step occurs upon each access to the service by the calling party.

5. The method of claim 2 wherein the collecting the information step further includes the step of:

providing the calling party with access to at least one directory service for assisting the calling party in identifying the information.

6. The method of claim 3 wherein the service is accessed by the calling party using a toll-free telephone number.

7. The method of claim 1 wherein the information collected from the calling party includes a priority associated with particular ones of the communications devices such that the telecommunications service provider attempts to extend the call to the called party in accordance with the priority associated with the particular ones of the communications devices.

8. A method for use by a telecommunications service provider in offering a telecommunications service, the method comprising the steps of:

receiving a request from a calling party for access to the telecommunications service, the telecommunications service providing the calling party with the ability to contact a called party as a function of contact information input directly by the calling party and which is independent from any information originating from the telecommunications service;

routing, in response to the received request the request from the calling party to the telecommunications service;

transmitting a series of queries from the telecommunications service to the calling party, at least one query requesting from the calling party a designation of the contact information for use in contacting the called party, the contact information including information regarding a plurality of communications devices and a plurality of contact numbers, each one of the plurality of contact numbers corresponding to a respective one communications device of the plurality of communications devices;

receiving the designation of the contact information from the calling party; and in response to the designated contact information received from the calling party, contacting the called party as a function of the designated contact information.

9. The method of claim 8 wherein the contacting the called party step includes the further steps of:

extending a first call through a communications network to a first one of the plurality of contact numbers; and monitoring the extending the first call step and determining whether the first call has been completed between the calling party and the called party, and if the not completed, extending a second call to the called party to a second one of the plurality of contact numbers.

10. The method of claim 9 further comprising the step of:

storing the designated information received from the calling party in a calling party sequence control record.

11. The method of claim 10 comprising the further steps of:

providing the calling party with a personal identification number and updating the calling party sequence control record to contain the personal identification number;

querying the calling party to input the personal identification number;

in response to receiving the personal identification number, retrieving the calling party sequence control record containing the personal identification number from the database; and modifying the retrieved calling party sequence control record as a function of inputs received from the calling party.

12. The method of claim 9 wherein the request for access to the telecommunications service from the calling party is made by placing a toll-free telephone call to the telecommunications service.

13. The method of claim 10 wherein the calling party sequence control record includes billing information for use by the telecommunications service provider in creating a billing record for the first call or the second call extended through the communications network.

14. The method of claim 1 or 8 wherein at least one of the communications devices is a communications device selected from the group: wired telephone, cellular telephone, facsimile machine, personal computer and paging device.

15. The method of claim 8 wherein the contacting the called party step includes the further step of:

extending a plurality of calls through a communications network, each call of the plurality of calls being extended to a particular one of the plurality of communications devices at its respective contact number.

16. The method of claim 15 wherein a predefined period of time is exhausted prior to extending the each call of the plurality of calls through the communications network.

17. A method for use by a telecommunications carrier, the method comprising the steps of:

establishing a communication between a particular calling party of a plurality of calling parties with a service offered by the telecommunications carrier;

receiving, in response to the established communication, from the calling party, a designation of contact information which includes information regarding a plurality of communications devices and a plurality of contact numbers for use in contacting a particular called party of a plurality of called parties, each one of the plurality of contact numbers corresponding to at least one communications device of the plurality of communications devices, the designation of contact information being independent of any information originating from the telecommunication carrier in the offered service;

storing, in a particular one of a plurality of calling party sequence control records, the designation of the plurality of communications devices and the plurality of contact numbers received from the particular calling party;

retrieving, in response to input received from the particular calling party, the particular one calling party sequence control record of the plurality of sequence control records; and extending a call through a communications network, in turn, to particular ones of the communications devices of the plurality of communications devices at their respective contact numbers as contained in the retrieved calling party sequence control record, until the call is completed to any of the particular ones of the communications devices.

18. The method of claim 17 further comprising the steps of:

querying the particular calling party for input of at least one additional communications device and associated contact number which is not contained in the retrieved calling party sequence control record; and extending a call to the at least one additional communications device at the associated contact number.

19. The method of claim 18 wherein the service provided by the telecommunications carrier is accessed by the particular calling party using a toll-free number associated with the service.

20. The method of claim 18 wherein the input received from the particular calling party includes a personal identification number previously assigned by the telecommunications carrier to the particular calling party.

21. The method of claim 20 wherein the input received from the calling party is entered through a voice response made by the calling party to the service.

22. The method of claim 17 wherein during the extending the call step a predefined period of time is exhausted prior to extending the call to the next communications device.

23. The method of claim 22 where the designation of the plurality of communications and the plurality of contact numbers is made by the particular calling party using a touch-tone telephone.

24. The method of claim 17 wherein the telecommunications carrier provides the particular calling party with access to at least one directory service for assisting the particular calling party in identifying the plurality of contact numbers.

25. The method of claim 17 wherein at least one of the communications devices is a communications device selected from the group: wired telephone, cellular telephone, facsimile machine, personal computer and paging device.

* * * * *